United States Patent
Kuwahara

Patent Number: 5,145,038
Date of Patent: Sep. 8, 1992

[54] EDDY CURRENT TYPE RETARDER

[75] Inventor: Tohru Kuwahara, Kawasaki, Japan

[73] Assignee: Isuzu Motors Limited, Tokyo, Japan

[21] Appl. No.: 693,987

[22] Filed: Apr. 29, 1991

[30] Foreign Application Priority Data

Apr. 28, 1990 [JP] Japan .................. 2-112026

[51] Int. Cl.$^5$ .......... B60L 7/28; F16D 63/00
[52] U.S. Cl. ................... 188/158; 188/161; 188/164; 188/267; 310/93; 310/105
[58] Field of Search ......... 188/158, 159, 161, 164, 188/267; 310/105, 93

[56] References Cited

U.S. PATENT DOCUMENTS

| | | | |
|---|---|---|---|
| 3,062,977 | 11/1962 | Reynst | 310/93 |
| 3,488,535 | 1/1970 | Baermann | 310/93 |
| 3,601,641 | 8/1971 | Baermann | 310/105 X |

FOREIGN PATENT DOCUMENTS

1090749  11/1967  United Kingdom .......... 310/93

Primary Examiner—Robert J. Oberleitner
Assistant Examiner—Peter M. Poon
Attorney, Agent, or Firm—Dykema Gossett

[57] ABSTRACT

An eddy current type retarder for a vehicle comprises a hollow rotor mounted on an engine-rotated shaft, a first stator mounted on a frame of the vehicle such that it faces an inner wall of the rotor, a first group of permanent magnets mounted on the first stator at intervals in the circumferential direction of the first stator with poles of the magnets being reversed alternately in the circumferential direction of the first stator, a second stator adapted to be movable relative to the first stator and provided near the first stator such that the second stator faces the inner wall of the rotor, a second group of permanent magnets mounted on the second stator at the same intervals as the first group of permanent magnets in the circumferential direction of the second stator with poles of the magnets being reversed alternately like the first group of magnets, a magnetic-passage-forming-ring provided between the rotor and the first and second stators, the ring having ferromagnetic elements which extend over the first group of permanent magnets and the second stator, an actuator for moving the second stator such that the poles of the magnets of the first group are indentical with the poles of the adjacent magnets of the second group during a brake applying operation and such that the former are opposite the latter during a brake releasing operation.

14 Claims, 5 Drawing Sheets

EDDY CURRENT TYPE RETARDER

BACKGROUND OF THE INVENTION

1. Technical Field

The present invention relates to an eddy current type retarder for a vehicle and particularly to a retarder having a permanent magnet as a magnetic source.

2. Background of the Art

A retarder employing eddy current is generally known as an axiliary brake system for a vehicle to ensure safety braking. Such a retarder is particularlly useful when the vehicle is running on a long hill, for example, since a main brake (foot brake) is sometimes not enough to ensure sufficient and safe deceleration.

A typical retarder includes a rotor mounted on a rotary element (generally a propeller shaft or a shaft extending from a transmission) which rotates with wheels and a magnetic source (electromagnets or permanent magnets) mounted on a stationary element (generally a frame of the vehicle). Eddy current is produced by a relative speed difference between the magnetic source and the rotor and the eddy current produces brake force to the rotary element.

FIG. 7 of the accompanying drawings shows an eddy current type retarder (x) owned by the present assignee (Japanese Patent Application No. 1-218499 and not published yet). This retarder uses permanent magnets as the magnetic source. As illustrated, an output shaft (a) extends from the back of a transmission housing (c) and a hollow drum-shaped rotor (b) is mounted on the output shaft (a). Permanent magnets (d) extend in the rotor (b). The magnets (d) are indirectly mounted on the transmission housing (c). Each magnet (d) is movable in an axial direction of the drum-shaped rotor (b) or an axial direction of the shaft (a). In other words, each magnet (d) can approach and leave the rotor (b). The permanent magnets (d) are arranged at certain intervals on a support ring (e) such that the magnets (d) face the inner wall of the rotor (b) in the circumferential direction of the rotor (b). The poles of the magnets (d) are reversed in the direction they are arranged, i.e., if an N pole of one magnet faces the inner wall of the rotor (b), an S pole of an adjacent magnet faces the inner wall.

When the retarder (x) is operated to apply the brake force to the vehicle, the support ring (e) is moved to the right in FIG. 7 by an actuator (f) such as an air cylinder as indicated by the solid line in illustration. Consequently, the permanent magnets (d) approach the rotor (b). Then, magnetic circuits are formed between two adjacent magnets (d) on the stationary member (e) and the rotating member (b), and eddy current flows in the inner wall of the rotor (b). The eddy current imposes the brake effort on the output shaft (a) and the vehicle is decelerated.

When the brake is released, the support ring (e) or the magnets (d) are moved in FIG. 7 by the actuator (f) as indicated by the broken line. As a result, the magnets (d) leave the rotor (b) and the magnetic connection between the magnets (d) and the rotor (b) is cut. At this situation, the brake force is not applied to the output shaft (a) since the eddy current no longer flows in the rotor (b).

Another eddy current type retarder (y) is illustrated in FIG. 8. This retarder is disclosed in a Japanese Patent Application of Sumitomo Metal Co., Ltd., published Dec. 1, 1989 with the publication No. 1-298947. In this brake system, a drum-shaped rotor (h) is mounted on a rotary shaft (g) and permanent magnets (i) are positioned in the rotor (h). The shaft (g) is connected with wheels (not shown). The magnets (i) are mounted on a support ring (j) at predetermined intervals and face the inner wall of the rotor (h). The magnets (i) are mounted on the support ring (j) such that the poles of the magnets which face the inner wall of the rotor (h) are alternately reversed. The support ring (j) is mounted on a stationary member (not shown). The support ring (j) is adapted to rotate about a shaft (g) within a certain angle range. Between the permanent magnets (i) and the rotor (h), there are provided ferromagnetic elements (k) and non-magnetic elements (1). Both elements (k) and (l) are mounted on the stationary member. The ferromagnetic elements (k) are provided at predetermined intervals such that each ferromagnetic element (k) can be selectively faced by the corresponding permanent magnet (i). The non-magnetic elements (l) are located between each two adjacent ferromagnetic elements (k).

When the retarder (y) is operated to apply the brake force to the shaft (g), the support ring (j) is rotated to a position shown in FIG. 8 such that the respective ferromagnetic elements (k) face the corresponding permanent magnets (i). As a result, magnetic circuits (m) are formed between the rotor (h), each two adjacent ferromagnetic elements (k) and each two adjacent magnets (i). Thus, eddy current is produced in the inner wall of the rotor (h) as the rotor (h) rotates, and the rotation of the shaft (g) is decelerated.

When the brake force is released, the support ring (j) is rotated about the shaft (g) to a position as shown in FIG. 9. Specifically, the ring (j) is moved clockwise or countercloskwise in a manner such that each ferromagnetic element (k) faces vacant space between the magnets (i). In this case, as illustrated, since the ferromagnetic element (k) is longer than the magnet (i), the ends of the ferromagnetic element (k) still face the ends of the magnets (i). Accordingly, different types of magnetic circuits (n) are formed between the ferromagnetic elements (k) and the magnets (i). However, the magnetic circuits (n) do not reach or penetrate the rotor (h) in this case. Therefore, the eddy current is not generated in the rotor (h). The ferromagnetic elements (k) serve as the magnetic shield at the brake releasing operation.

Meanwhile, the above-described retarders (x) and (y) have following disadvantages.

In the brake device (x) of FIG. 7, since the brake force is controlled by the movement of the permanent magnets (d) in the axial direction of the rotor (b) in the hollow part of the rotor (b), the brake device (x) requires a large space ($l_1$) (the sum of space for the movement of the magnets (d) and space for the acutator (f) in the axial direction of the rotor (b), as shown in FIG. 7. Thus, when the brake device (x) is mounted on the shaft (a) extending from the back of the transmission housing (c), the rotor (b) overhangs toward a propeller shaft joint (p). The overhanging rotor (b) becomes an obstacle to a mechanic when he removes and assembles the propeller shaft. Particularly, if the brake device is mounted on a truck, a cross member of a frame of the truck extends near the brake device so that the probelm becomes more serious.

In the brake device (y) of FIG. 8 or 9, the magnets (i) mounted on ring (j) are moved about the shaft (g) to control the brake force. Consequently, the brake device (y) requires space smaller than the brake device (x) of FIG. 7. In other words, the brake device (y) can be designed compact as compared with the brake device (x). However, in the brake releasing operation of the brake device (y), some magnetic fluxes from the magnets (i) penetrate the non-magnetic elements (l) since the non-magnetic elements (l) are relatively thin, as indicated by the broken line (q) in FIG. 9. The magnetic fluxes which have penetrate the non-ferromagnetic elements (l) reach the rotor (h) and form magnetic circuits (q) between the rotor (h) and the magnets (i). As a result, a small amount of eddy current flows in the rotor (h) even in the brake releasing operation. In other words, magnetism leakage occurs in the brake releasing operation. This lowers the fuel consumption rate of the vehicle.

SUMMARY OF THE INVENTION

An object of the present invention is to provide a compact brake device employing eddy current.

Another object of the present invention is to provide a brake device employing eddy current which does not suffer from magnetism leakage.

According to one aspect of the present invention, there is provided a brake device which comprises a hollow drum-shaped rotor mounted on a shaft rotated by an engine, an annular fixed stator mounted on a frame of a vehicle such that the fixed stator faces an inner wall of the drum portion of the rotor, a group of permanent magnets mounted on the fixed stator at intervals in the circumferential direction of the fixed stator with poles of the magnets being reversed alternately, an annular movable stator similar to the fixed stator in configuration and provided next to the fixed stator such that the movable stator also faces the inner wall of the rotor and adapted to be movable or rotatable relative to the fixed stator about mutual axis with the fixed stator, another group of permanent magnets mounted on the movable stator at the same intervals as the first group of magnets in the circumferential direction of the movable stator with poles of the magnets being reversed alternately like the first group of magnets, a magnetic-passage-forming-ring provided between the rotor and the fixed and movable stators, the ring having ferromagnetic elements which respectively extend over the first group of permanent magnets and the movable stator, the ferromagnetic elements being spaced in the circumferential direction of the first stator at the same intervals as the first group of magnets and an actuator for rotating the second stator about its axis such that the poles of the magnets of the first group be indentical with the poles of the adjacent magnets of the second group respectively at one occasion and such that the poles of the magnets of the first group be opposite the poles of the adjacent magnets of the second group respectively at another occasion.

Brake force is applied to the engine-rotated shaft as the movable stator is moved by the actuator to a position (brake applying position) at which the poles of the magnets on the movable stator become ths same poles of the adjacent magnets on the fixed stator. This is because magnetic fluxes from the magnets on the fixed and movable stators penetrate the magnetic-passage-forming-ring and reach the rotor and eddy current flows in the rotor due to the relative velocity difference between the rotor and the stators. On the other hand, the brake force is released from the propeller shaft as the movable stator is moved to a position (brake releasing position) at which the poles of the magnets on the movable stator become the opposite poles of the adjacent magnets on the fixed stator. This is because the magnetic fluxes from the magnets on the fixed stator (or the movable stator) do not penetrate the magnetic-passage-forming-ring. In this case, the magnetic fluxes from the magnets on the fixed stator reach the magnetic-passage-forming-ring but return to the magnets on the movable stator adjacent to the magnets on the fixed stator since the poles of each two adjacent magnets are opposite. If the poles of the adjacent magnets on the fixed and movable stators are the same like the previous case (brake applying case), the magnetic fluxes do not return soon but penetrate the magnetic-passage-forming-ring to reach the rotor and then return to the magnets on the next pair of magnets on the fixed and movable stators since the poles of the next magnets on the two stators are the opposite poles.

The ferromagnetic elements extend over the respective magnets mounted on the fixed stator so that the entire magnetic fluxes from the magnets on the fixed stator enter the ferromagnetic elements. When the movable stator is moved to the brake releasing position, the magnets on the movable stator are also covered by the ferromagnetic elements respectively so that the entire magnetic fluxes from the magnets on the movable stator also enter the ferromagnetic elements. Thus, the magnetic leakage to the rotor will not occur in the brake releasing operation. In addition, since the movement of the movable stator is the rotation about its center axis, the retarder can be designed compact as compared with the retarder in which the movement of the movable stator is reciprocation.

DESCRIPTION OF THE PREFERRED EMBODIMENTS

Now, a preferred embodiment of the present invention will be described with reference to the accompanying drawings.

Figure 1:
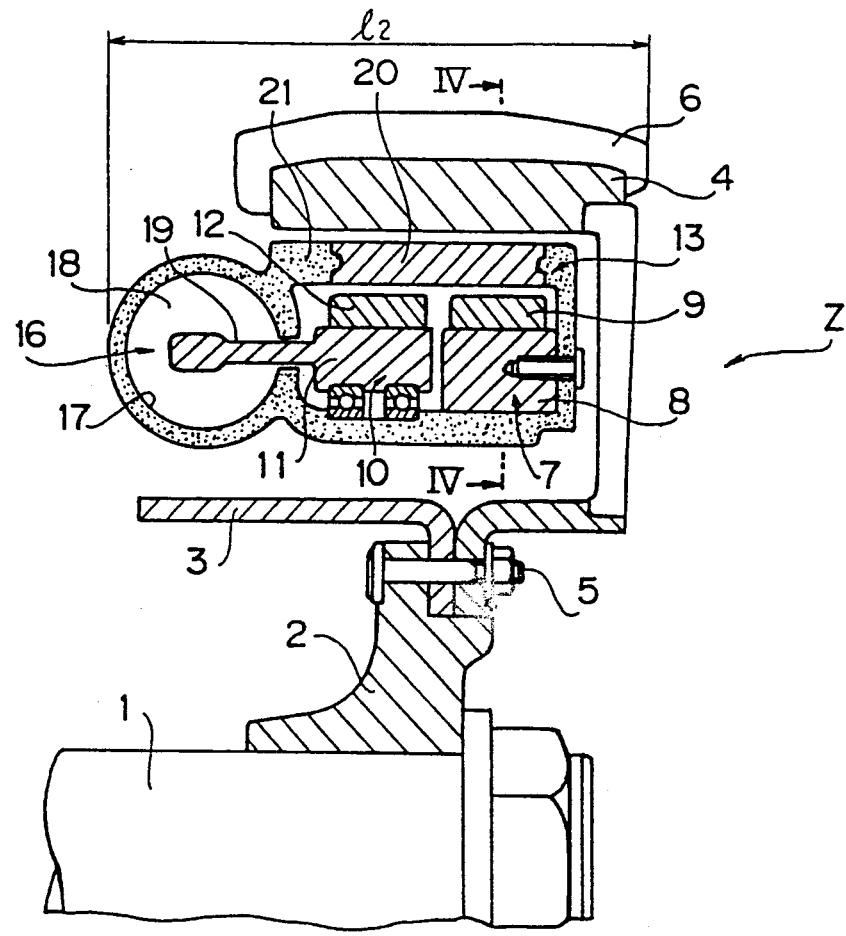
FIG. 1 is a sectional view of a major part of an eddy current type retarder according to the present invention.

Referring to FIG. 1, an output shaft 1 of a transmission of a vehicle has a flange 2 extending in a radial direction of the shaft 1. A brake drum 3 for parking brake and a rotor 4 for an eddy current type retarder (z) are mounted on the flange 2 by a mutual bolt 5. The rotor 4 is made from a conductive and ferromagnetic material and shaped like a hollow drum. The center axis of the rotor 4 coincides with the center axis of the shaft 1. The rotor 4 has heat radiaton fins 6 on the surface thereof.

Figure 4:
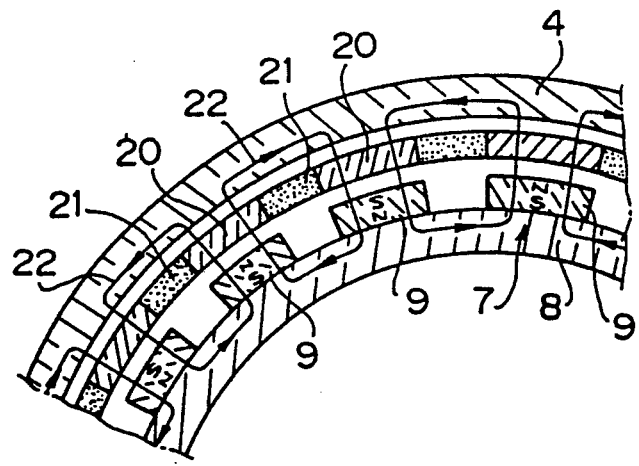
FIG. 4 is a sectional view taken along the line IV—IV of FIG. 1 during the brake applying operation.

Inside the rotor 4, a first stator (fixed stator) 7 extends and faces the inner wall of the drum portion of the rotor 4. The first stator 7 is mounted on a transmission housing (not shown) and cannot move. Referring to FIG. 4, the stator 7 includes an annular yoke 8. The yoke 8 is coaxial with the rotor 4 and defines a drum-like configuration similar to the drum portion of the rotor 4. The magnets 9 are mounted on the yoke 8 such that they face the inner wall of the rotor 4. The magnets 9 are arranged at predetermined intervals in a circumferential direction of the yoke 8 with poles of the magnets 9 being alternately reversed in the direction the magnets 9 are arranged. Thus, if S pole of one magnet faces the inner wall of the rotor 4, N pole of the next magnet faces the inner wall of the rotor 4.

Referring back to FIG. 1, a second stator 10 is provided next to the first stator 7. The second stator 10 also faces the inner wall of the rotor 4. The second stator 10 is movable or rotatable relative to the first stator 7 by a predetermined angle about its center axis. The second stator 10 has a structure similar to the first stator 7 and the center axes of the two stators coincide with each other. Specifically, the second stator 10 has an annular movable yoke 11 and a second group of permanent magnets 12. The second yoke 11 is coaxial with the rotor 4 and defines a drum portion similar to the drum portion of the rotor 4. The second group of magnets 12 are mounted on the second yoke 11 at intervals such that they face the inner wall of the rotor 4. The magnets 12 are arranged such that poles are alternately reversed in the circumferential direction of the second yoke 11.

The fixed yoke 8 and the movable yoke 11 are respectively made from a ferromagnetic material such as Fe. The first and second group of permanent magnets 9 and 12 are made from a rare earth material such as neodymium since such a material makes the magnets compact and light weight and ensures powerful magnetic power.

Figure 2:
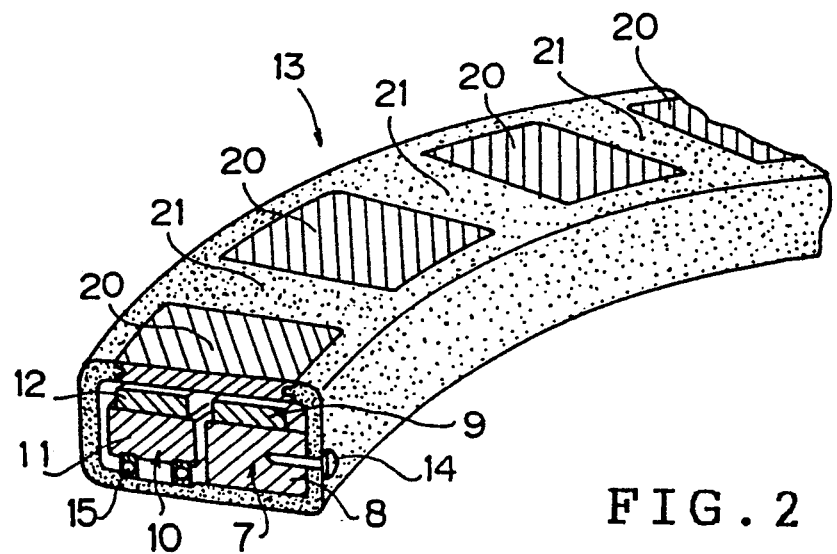
FIG. 2 is a partial perspective view showing a casing of the retarder of FIG. 1.

The fixed stator 7 and the movable stator 10 are housed in a common casing 13 mounted on a transmission housing (not shown), as shown in FIG. 1. The casing 13 is shaped like a hollow drum and coaxial with the shaft 1, as shown in FIG. 2. There is a gap (air gap) between the inner wall of the rotor 4 and the surface of the casing 13. Inside the casing 13, the fixed stator 7 is mounted on the casing 13 at the yoke 8 with screws 14. On the other hand, the movable stator 10 is supported on bearings 15 inside the casing 13 so that the movable stator 10 can move in the casing 13 in the circumferential direction of the casing 13. In other words, the movable stator 10 can rotate relative to the fixed stator 7.

An actuator 16 is attached to the casing 13, as shown in FIG. 1 and the yoke 10 is moved by the actuator 16. The actuator 16 includes an air cylinder which is adapted to be movable in a direction perpendicular to the sheet of the drawing. A piston 18 is also moved in the direction perpendicular to the drawing sheet upon introduction of high pressure air into a cylinder chamber 17. An arm 19 is coupled to the piston 18 via a universal joint at one end thereof and to the movable stator 10 directly at the other end thereof. Therefore, the movable stator 10 rotates as the piston 18 moves.

As shown in FIGS. 1 and 2, that part of the casing 13 which lies between the rotor 4 and the magnets 9 and 12 (or the stators 7 and 10) includes ferromagnetic elements 20 and non-ferromagnetic elements 21. The element 20 is indicated by oblique lines and element 21 is indicated by dots in the illustration. These elements 20 and 21 define a magnetic-passage-forming-ring which extends between the rotor 4 and the stators 7 and 10.

The ferromagnetic elements 20 are made from a low carbon, almost pure iron material such as ferrite. Each ferromagnetic element 20 lies over one magnet 9 and the movable stator 10. More specifically, as shown in FIG. 4, one ferromagnetic element 20 is positioned over one magnet 9. The ferromagnetic elements 20 are provided in the circumferential direction of the rotor 4 with intervals corresponding to the intervals of the magnets 9. The elements 20 define pole pieces for the magnets 9, respectively.

Between the ferromagnetic elements 20, there are formed non magnetic elements 21 which are made from a magnetic insulation material such as aluminum. Thus, the non-magnetic elements 21 define a magnetic-passage-intercepting-member.

Now, the function of the retarder will be described.

Figure 3:
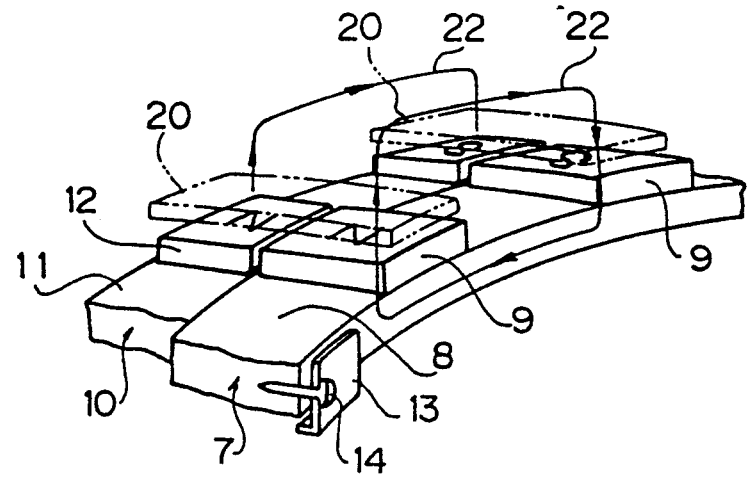
FIG. 3 is a partial perspective view of a movable stator and a fixed of FIG. 1 in a brake applying operation.

When the brake force is applied to the vehicle on which the retarder is mounted, the movable stator 10 is rotated by a predetermined angle by the actuator 16 in a manner such that the the first group of magnets 9 and the second group of magnets 12 are arranged next to each other in the same manner, as shown in FIG. 3. The same manner means that if the N pole of one magnet 9 faces the inner wall of the rotor 4, the rotor-facing-pole of the adjacent magnet 12 is also N. Thus, the magnets 9 and 12 form in combination an N-S-N-S-pole arrangement in the circumferential direction of the rotor 4, as shown in FIGS. 3 and 4. In this case, each ferromagnetic element 20 extends over each pair of magnets 9 and 12. Therefore, magnetic fluxes from the magnets 9 and 12 penetrate the ferromagnetic elements 20 and reach the rotor 4. Accordingly, magnetic circuits 22 are formed between the rotor 4 and the stators 7 and 10. The magnetic fluxes from one magnet 9 on the fixed stator 7 extend to the next magnet 9 through the rotor 4 and the magnetic fluxes from one magnet 12 on the movable stator 10 extend to the next magnet 12 through the rotor 4. Eddy current is generated by a relative velocity difference between the rotor 4, and the stators 7 and 10. The eddy current applies brake force to the shaft 1 and the vehicle is decelerated.

Figure 5:
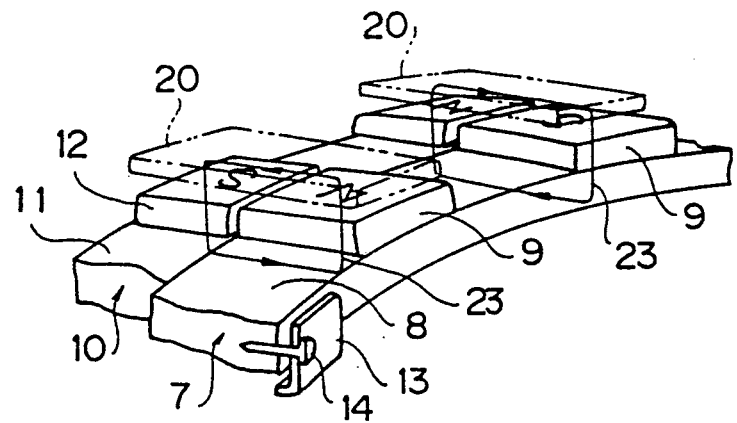
FIG. 5 is a partial perspective view of the movable stator and the fixed stator shown in FIG. 1 in a brake releasing operation.
Figure 6:
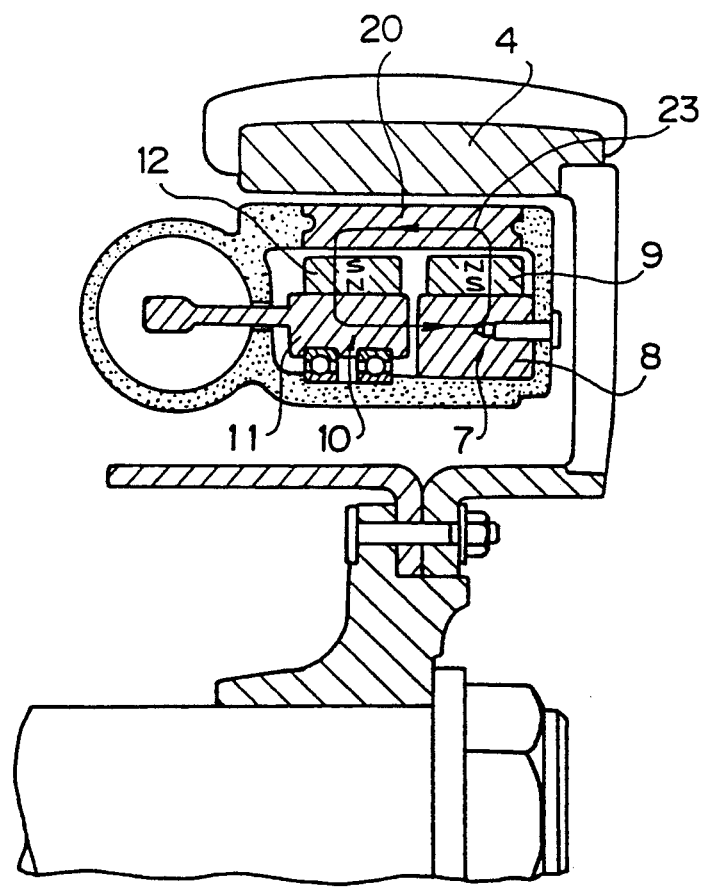
FIG. 6 is a sectional view of a major part of the retarder of FIG. 1 during the brake releasing operation.

When the brake force is released, the stator 10 is moved by the actuator 16 to a position (brake releasing position) as shown in FIG. 5. Specifically, the stator 10 is moved in a manner such that the poles of the magnets 12 become the opposite poles of the adjacent magnets 9 on the other stator 7. Then, as shown in FIGS. 5 and 6, different magnetic circuits 23 are formed. The magnetic fluxes from the magnets 9 do not penetrate the ferromagnetic elements 20 and do not reach the rotor 4. In other words, the magnetic fluxes from one magnet 9 on the fixed stator 7 extend to the adjacent magnet 12 on the movable stator 10 through the ferromagnetic element 20. This is because the pole of the magnet 9 is the opposite pole of the adjacent magnet 12. Thus, the eddy current is not produced in the rotor 4 and the brake force is no longer applied to the vehicle.

Figure 9:
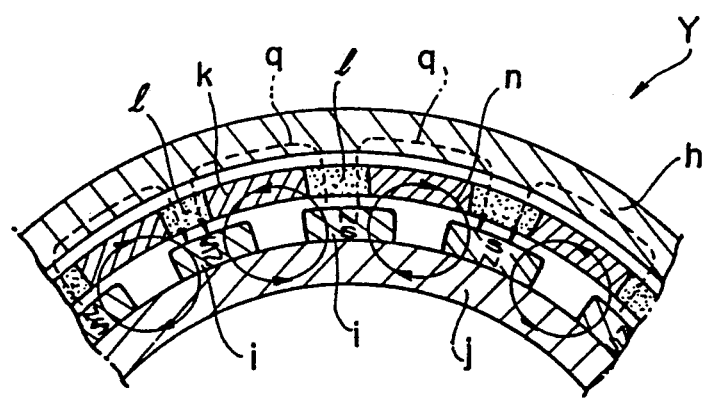
FIG. 9 is a sectional view of a major part of the retarder of FIG. 8 during a brake releasing operation.

In this case also, each ferromagnetic element 20 extends over each pair of magnets 9 and 12 such that the entire surfaces of the magnets 9 and 12 face the ferromagnetic elements 20 as shown in FIGS. 5 and 6. Thus, the magnetic fluxes from the magnets 9 and 12 are completely intercepted by the ferromagnetic elements 20 and no magnetic fluxes reach rotor 4. In a word, magnetic leakage will not occur. Therefore, as compared with the retarder (y) shown in FIG. 9 which suffers the magnetic leakage (q), the retarder (z) can lower the fuel consumption rate of the engine.

Figure 7:
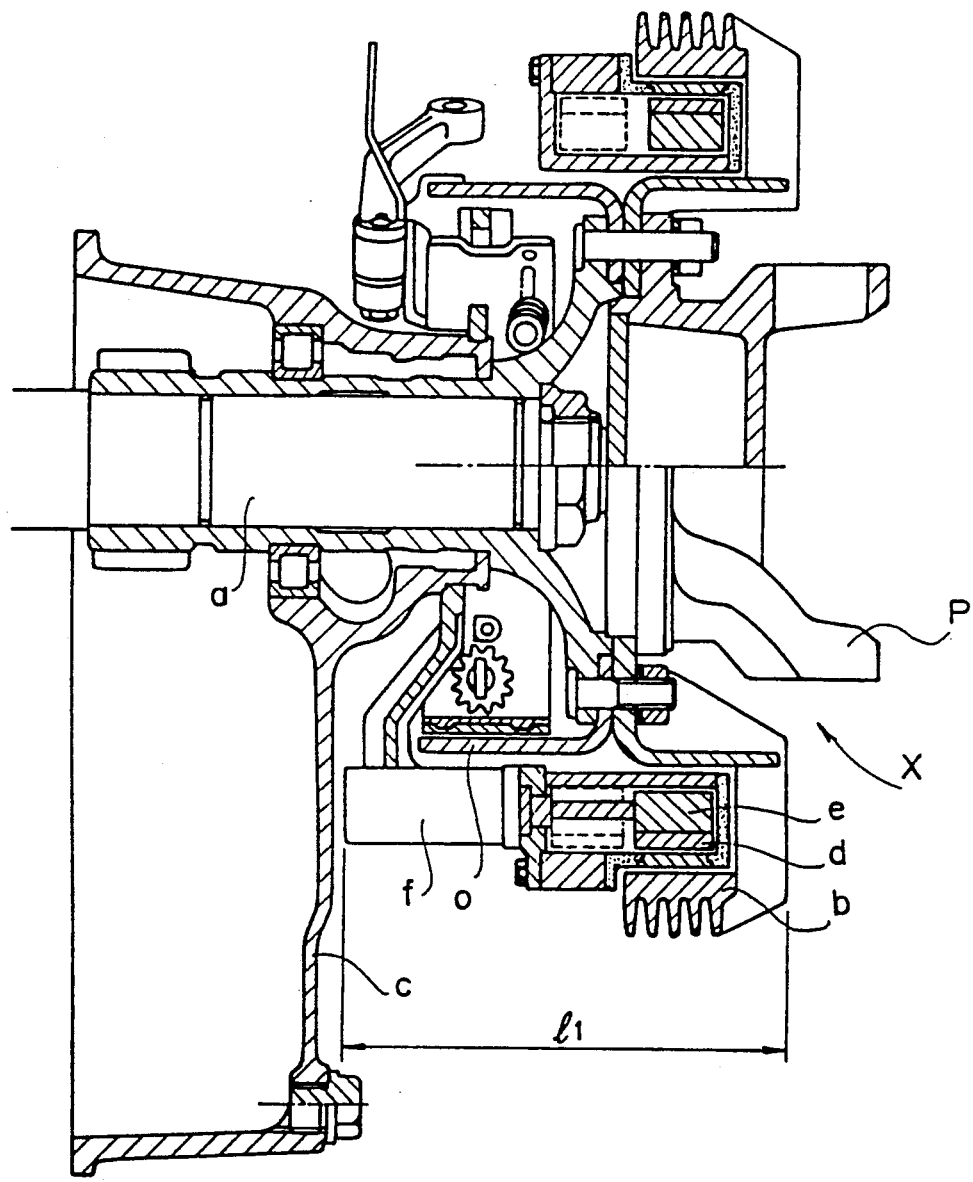
FIG. 7 is a sectional view of an eddy current type retarder developed by assignee of the present invention.
Figure 8:
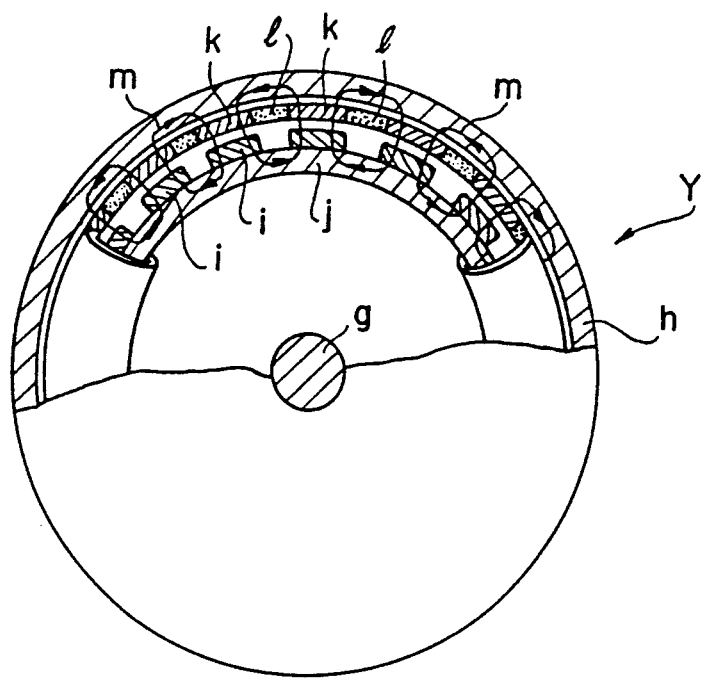
FIG. 8 is a partial section of a conventional eddy current type retarder.

In addition, since the retarder (z) of FIG. 1 controls the brake force by the rotation or the movement of the stator 10 about the shaft 1, the retarder (z) requires small space as compared with the retarder (x) of FIG. 7. Specifically, since any elements of the retarder (z) do not move in the longitudinal direction of the shaft 1, the length of the retarder can be reduced as compared with the retarder (x) of FIG. 7. The length of the retarder (z) of FIG. 1 in the longitudinal direction of the shaft 1 is ($l_2$) which is shorter than ($l_1$) of the retarder (x) of FIG. 7. Thus, the retarder (z) can be designed compact and does not overhang. Approximately, the length ($l_2$) is between one half and two thirds of the length ($l_1$).

We claim:

1. A retarder employing eddy current mounted on a shaft rotated by an engine of a vehicle, comprising:
    a hollow drum-shaped rotor mounted on the shaft, the rotor having an inner wall defined by a hollow portion of the rotor;
    a first stator mounted on a stationary member of the vehicle such that the first stator faces the inner wall of the rotor, the first stator having a circumferential direction and a center axis;
    a first group of permanent magnets mounted on the first stator at intervals in the circumferential direction of the first stator with poles of the magnets being reversed alternately in the circumferential direction of the first stator;
    a second stator provided near the first stator such that the second stator faces the inner wall of the rotor, the second stator having a circumferential direction and a center axis coinciding with the center axis of the first stator, the second stator being adapted to be movable relative to the first stator by a rotation about its center axis;
    a second group of permanent magnets mounted on the second stator at the same intervals as the first group of permanent magnets in the circumferential direction of the second stator with poles of the magnets being reversed alternately in the circumferential direction of the second stator;
    a magnetic-passage-forming-ring provided between the rotor and the first and second stators, the ring having ferromagnetic elements which respectively extend over the first group of permanent magnets and the second stator, the ferromagnetic elements being spaced in the circumferential direction of the first stator at the same intervals as the first group of magnets; and
    an actuator for moving the second stator such that the poles of the magnets of the second group are indentical with the poles of the adjacent magnets of the first group during a brake applying operation, and for moving the second stator such that the poles of the magnets of the second group are opposite the poles of the adjacent magnets of the first group during a brake releasing operation.

2. The retarder of claim 1, wherein a parking brake drum is mounted on the shaft together with the rotor by a single mounting element.

3. The retarder of claim 1, wherein heat radiation fins are formed on the rotor.

4. The retarder of claim 1, wherein the permanent magnets are made from a rare earth material.

5. The retarder of claim 1, wherein the first stator includes a ring-shaped first yoke positioned inside the rotor and the first group of magnets are mounted on the first yoke.

6. The retarder of claim 1, wherein the first stator includes a ring-shaped first yoke positioned inside the rotor, the first group of magnets are mounted on the first yoke and the first yoke is mounted on the magnetic-passage-forming-ring.

7. The retarder of claim 6, wherein the first yoke is made from a ferromagnetic material.

8. The retarder of claim 1, wherein the second stator includes a ring-shaped second yoke positioned inside the rotor and the second group of magnets are mounted on the second yoke.

9. The retarder of claim 1, wherein the second stator includes a ring-shaped second yoke positioned inside the rotor, the second group of magnets are mounted on the second yoke and the second yoke is mounted on the magnetic-passage-forming-ring via bearings.

10. The retarder of claim 9, wherein the second yoke is made from a ferromagnetic material.

11. The retarder of claim 1, wherein the magnetic-passage-forming-ring is formed as an integral part of a casing for the first and second stators.

12. The retarder of claim 11, wherein the casing is mounted on a transmission of the vehicle.

13. The retarder of claim 1, wherein the magnetic-passage-forming-ring includes non-magnetic elements which respectively fill up gaps between the ferromagnetic elements such that the non-magnetic elements define in combination a magnetic-passage-intercepting-member.

14. The retarder of claim 1, wherein the actuator includes an air cylinder device which has a cylinder mounted on the magnetic-passage-forming-ring, a piston positioned in the cylinder and adapted to be moved by high pressure air and an arm coupled to the piston via a universal joint at one end thereof and coupled to the second stator at the other end thereof.

* * * * *